United States Patent [19]

van der Lely

[11] 4,275,551
[45] Jun. 30, 1981

[54] HAYMAKING MACHINES

[76] Inventor: Cornelis van der Lely, 7, Brüschenrain, Zug, Switzerland

[21] Appl. No.: 33,752

[22] Filed: Apr. 26, 1979

Related U.S. Application Data

[63] Continuation of Ser. No. 786,029, Apr. 8, 1977, Pat. No. 4,157,644.

[30] Foreign Application Priority Data

Apr. 8, 1976 [NL] Netherlands ............... 7603683

[51] Int. Cl.³ ............... A01D 78/10; A01D 80/00
[52] U.S. Cl. ............................... 56/370; 56/17.2
[58] Field of Search ............... 56/370, 16.7, 17.2

[56] References Cited

U.S. PATENT DOCUMENTS

| 1,940,216 | 12/1933 | Jacobson | 56/16.7 |
|---|---|---|---|
| 2,287,126 | 6/1942 | Packwood | 56/16.7 |
| 2,509,936 | 5/1950 | Packwood | 56/16.7 |
| 2,961,251 | 11/1960 | Roberton | 56/17.2 |
| 2,962,854 | 12/1960 | Jepson | 56/17.2 |
| 3,334,911 | 8/1967 | Enters | 56/17.2 |
| 3,664,105 | 5/1972 | Stiefvater et al. | 56/370 |
| 3,789,590 | 2/1974 | Wilson | 56/16.7 |
| 4,015,412 | 4/1977 | Reber | 56/370 |
| 4,015,413 | 4/1977 | van der Plas | 56/370 |

FOREIGN PATENT DOCUMENTS

| 261966 | 5/1968 | Austria | 56/370 |
|---|---|---|---|
| 2024167 | 11/1970 | Fed. Rep. of Germany | 56/370 |
| 1961194 | 9/1971 | Fed. Rep. of Germany | 56/370 |
| 2160771 | 6/1972 | Fed. Rep. of Germany | 56/370 |
| 1034126 | 6/1966 | United Kingdom | 56/370 |
| 1220336 | 1/1971 | United Kingdom | 56/370 |

Primary Examiner—Paul J. Hirsch
Attorney, Agent, or Firm—Penrose Lucas Albright

[57] ABSTRACT

A haymaking machine has two tined raking heads driven to rotate about upwardly extending axes from respective mountings. The mountings are connected to the rear of beams that converge forwardly to a right-angled junction in a common gear box. A coupling near the junction is connectable to a three-point lifting hitch and a pair of spaced apart plates from a pivot connected at one side of the plates adjacent the junction. A retaining element secures the beams in operative positions about the pivot. Each rake head has two freely rotatable tubular or cylinder supporting members positioned thereunder, each of which is pivotably connected to a lower portion of their corresponding rake head. A rear crop guide is pivoted to each rake head near its mounting by a quadrilateral linkage which can be secured in any one of a plurality of guide positions.

1 Claim, 12 Drawing Figures

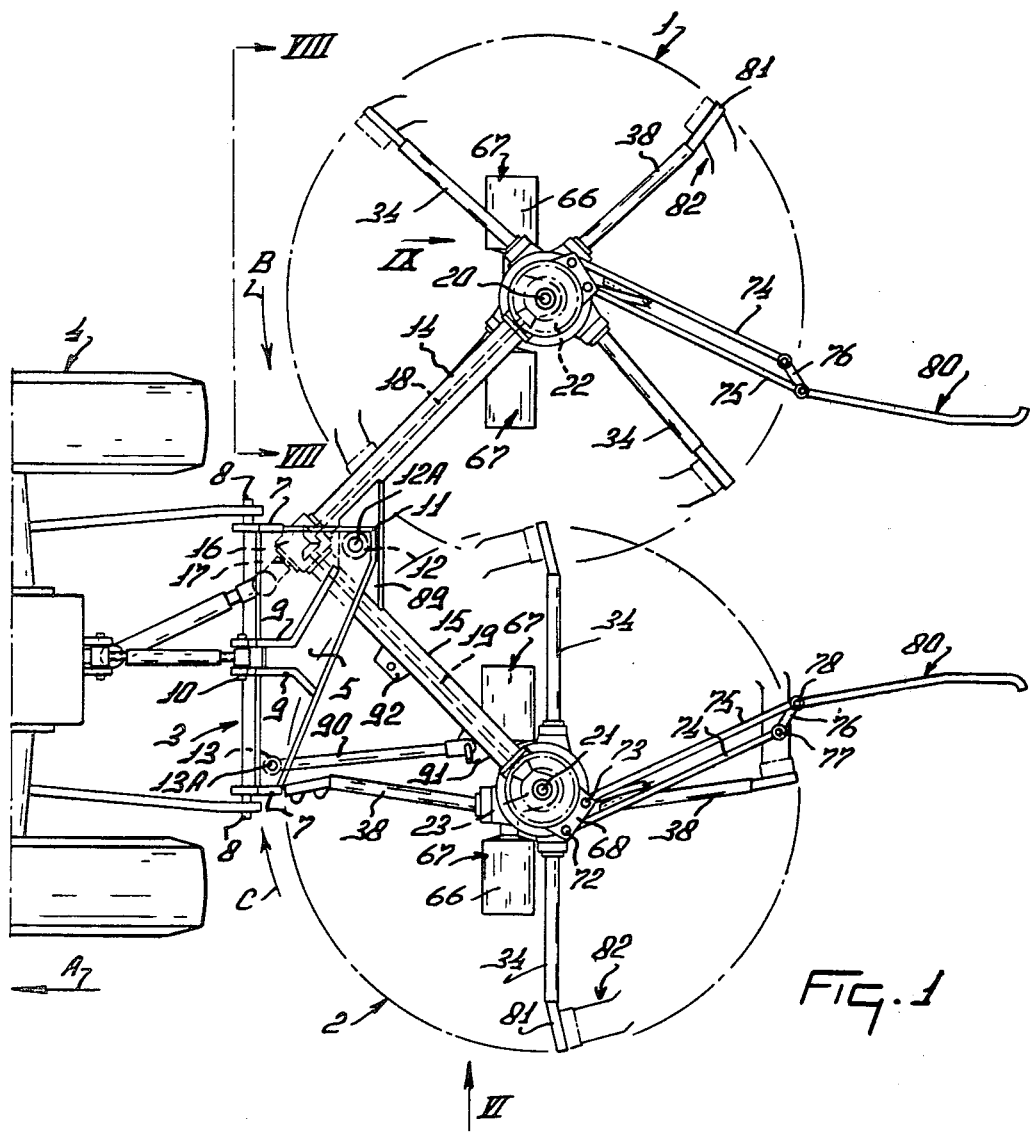
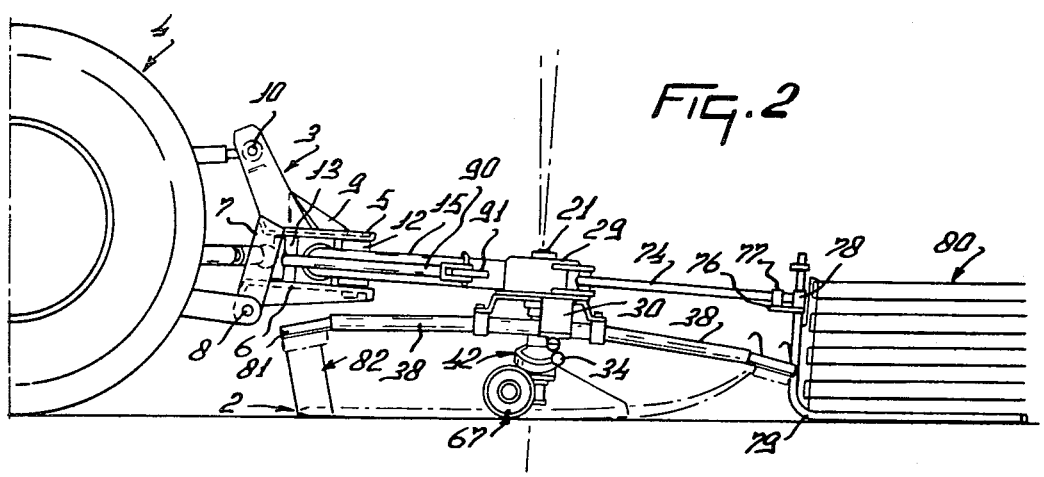

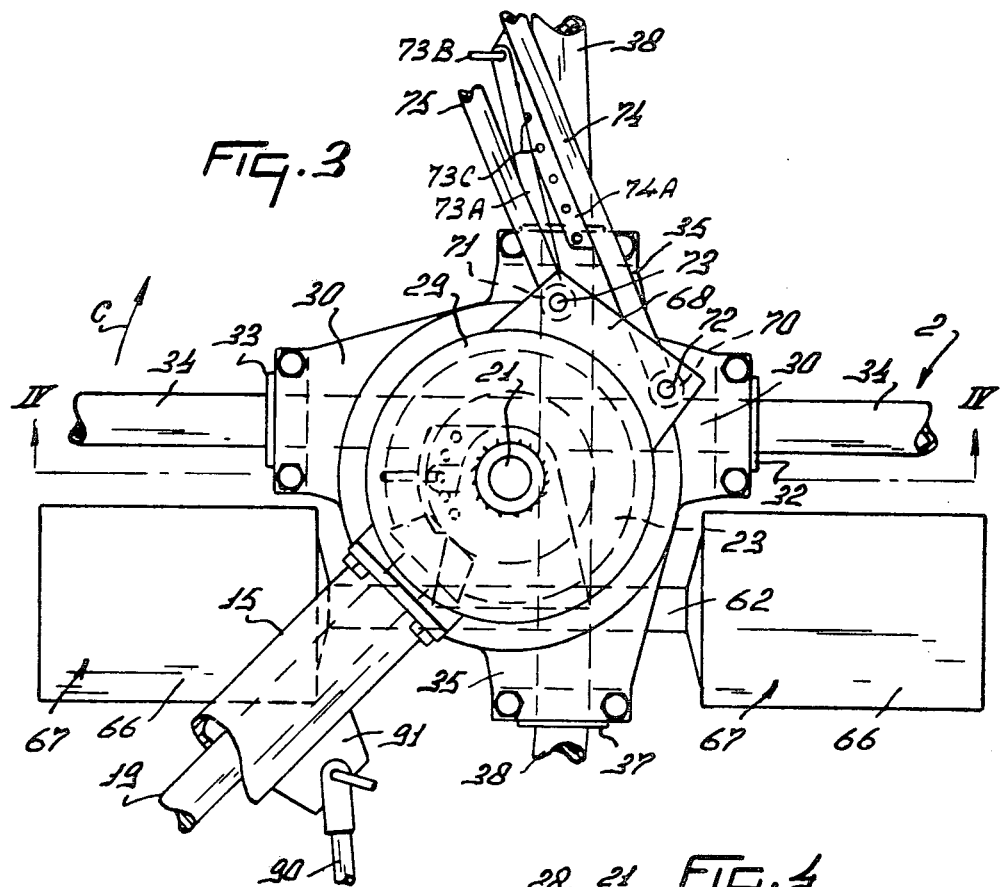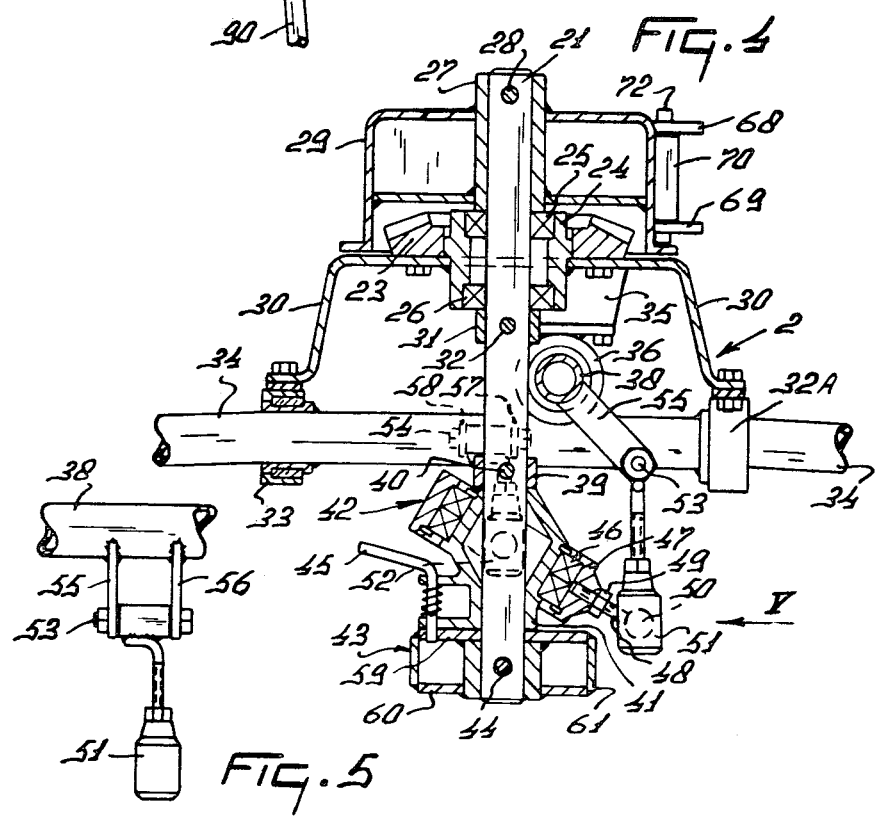

HAYMAKING MACHINES

This is a continuation of application Ser. No. 786,029 filed Apr. 8, 1977, now U.S. Pat. No. 4,157,644.

SUMMARY OF THE INVENTION

This invention relates to haymaking machines of the kind which comprise a frame, two rake members that are rotatable about corresponding upwardly extending axes, and a coupling member or trestle constructed and arranged for connecting said frame to the three-point lifting device or hitch of a tractor or other operating vehicle.

In one aspect of the invention, the axis about which each rake wheel is rotatable is defined by an upwardly extending shaft which is connected to a mounting on the frame. At least one freely rotatable supporting member is pivoted to the lower portion of the shaft and is also positioned laterally forward of the shaft. The supporting member's ground engaging surface is tubular or cylindrical having a length which is substantially greater than its diameter whereby the thread of the supporting member is increased with a commensurate decrease of a pressure per square inch of the supporting member on the ground, the directional stability of the haymaking machine thereby being improved.

BRIEF DESCRIPTION OF THE DRAWINGS

For a better understanding of the invention, and to show how the same may be carried into effect, reference will now be made, by way of example, to the accompanying drawings, in which:

FIG. 1 is a plan view of a haymaking machine in accordance with the invention connected to the rear of an agricultural tractor, FIG. 2 is a side elevation of the haymaking machine of FIG. 1, FIG. 3 is a plan view, to an enlarged scale, showing the construction and arrangement of parts at the centre of one of two rotary rake members of the machine of FIGS. 1 and 2 in greater detail, FIG. 4 is a section taken on the line IV—IV in FIG. 3, FIG. 5 is an elevation as seen in the direction indicated by an arrow V in FIG. 4, FIG. 6 is a side elevation, to an enlarged scale, as seen in the direction indicated by an arrow VI in FIG. 1, FIG. 8 is an elevation, to an enlarged scale and partly in section, as seen in the direction indicated by arrows VIII—VIII in FIG. 1.

DESCRIPTION OF THE PREFERRED EMBODIMENT

Figures 6, 8:
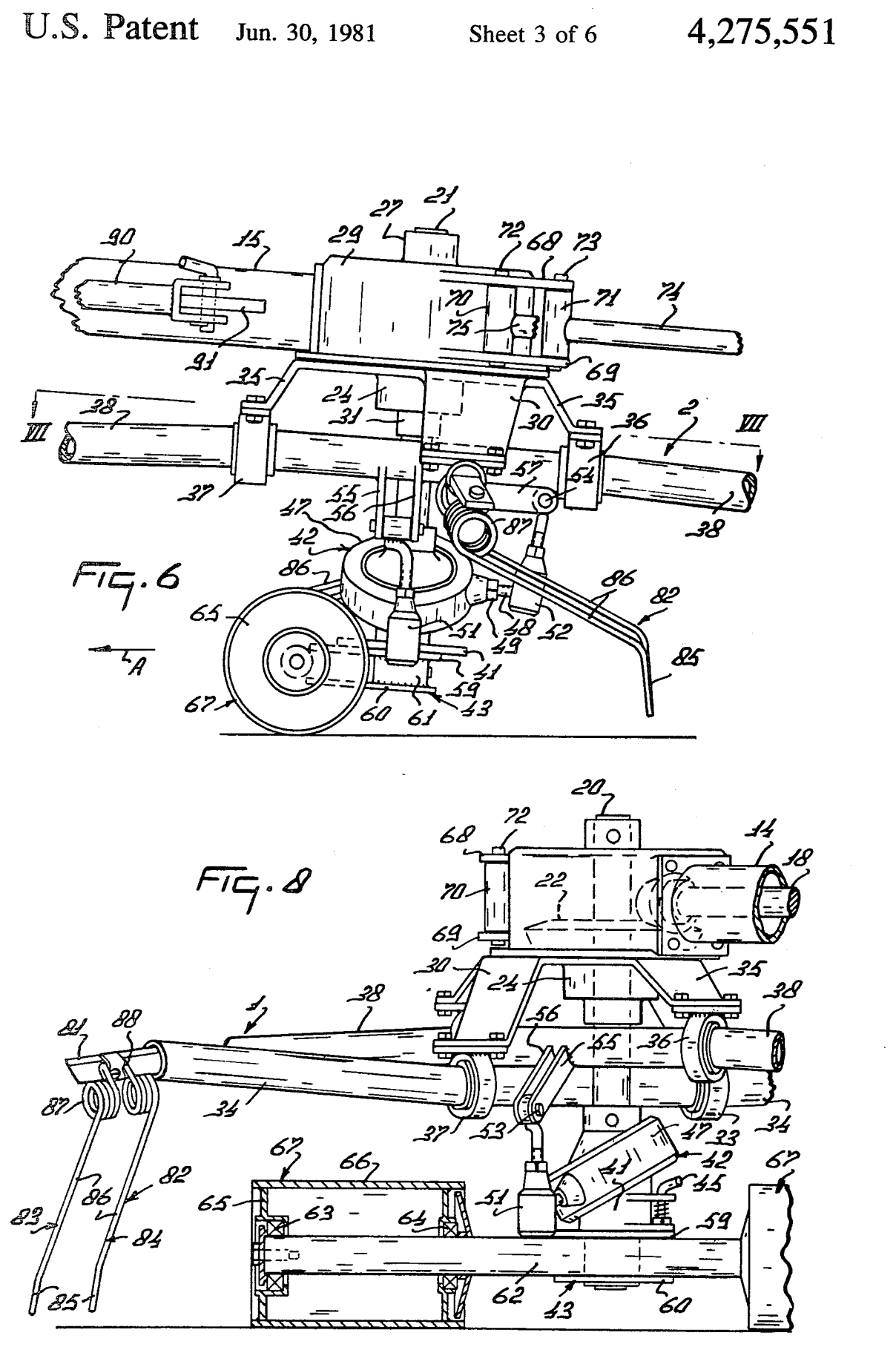
Figure 7:
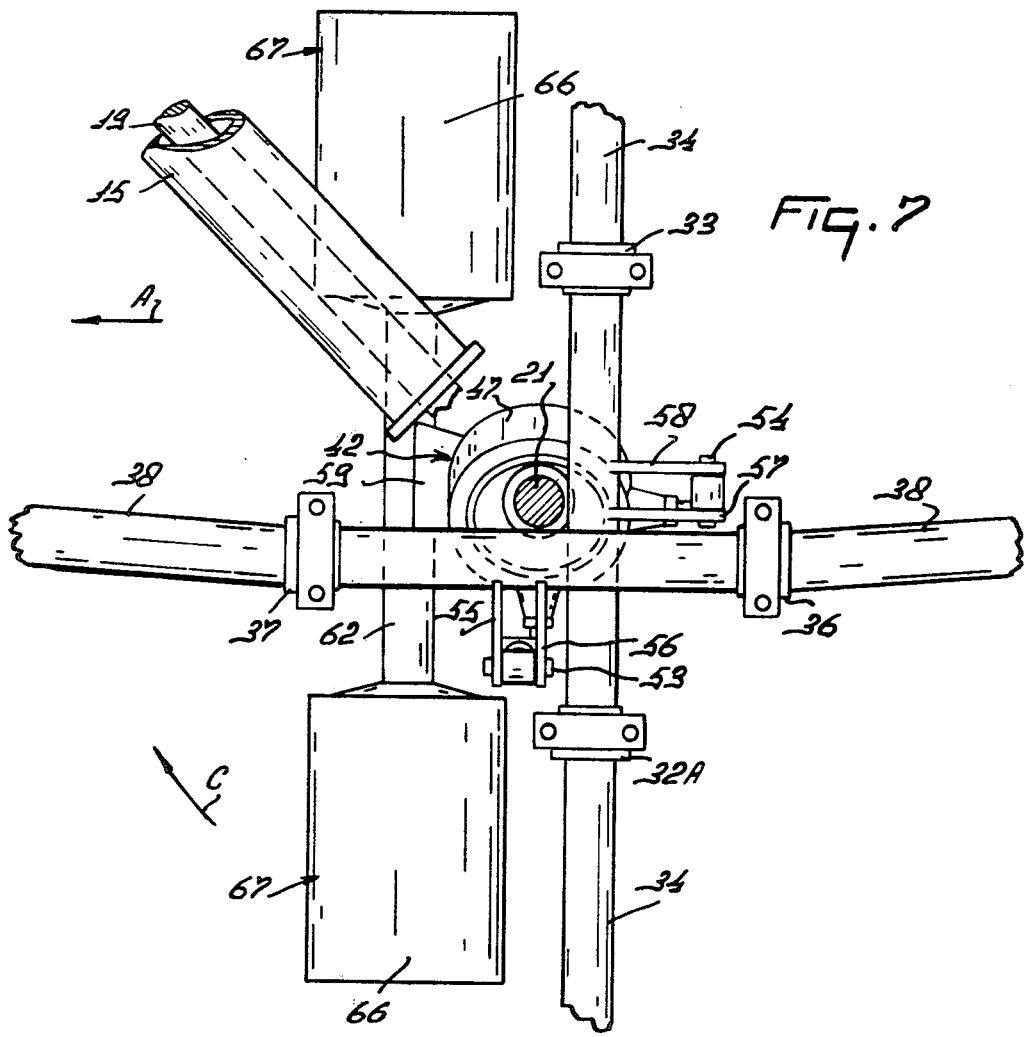
FIG. 7 is a section taken on the line VII—VII in FIG. 6.

Referring firstly to FIGS. 1 to 8 of the accompanying drawings, the haymaking machine that is illustrated therein comprises two rotary rake members or rake heads 1 and 2 which will hereinafter be referred to only at "rake members" for the sake of brevity. The two rake members 1 and 2 are arranged in side-by-side relationship in a direction that is transverse, and usually substantially perpendicular, to the intended direction of operative travel of the machine that is indicated in FIGS. 1, 6, 7 and 12 of the drawings by an arrow A. The two rake members 1 and 2 are arranged to revolve about corresponding upwardly extending axes that are parallel to one another, said rake members 1 and 2 being indirectly connected, when the machine is in use, to a three-point lifting device or hitch at the rear of an agricultural tractor 4 or other operating vehicle by a coupling member or trestle 3 and by other parts of the machine that will be described below. The coupling member or trestle 3 includes an upper plate 5 and a lower plate 6, said plates 5 and 6 being in parallel but spaced apart relationship with the general plane of each plate perpendicular or substantially perpendicular to the parallel axes of rotation of the two rake members 1 and 2. The upper plate 5 registers with the lower plate 6 as seen in the plan view of FIG. 1 of the drawings and both plates have the same substantially right-angled triangular shape that is visible in FIG. 1 in respect of the upper plate 5, the two plates 5 and 6 being substantially identical, or closely similar, in dimensions.

The two corners of the upper and lower plates 5 and 6 that are foremost with respect to the direction A are interconnected by upwardly extending coupling strips 7 which perform a supporting function, said strips 7 being inclined forwardly with respect to the direction A, and steeply downwardly, from the upper plate 5 to the lower plate 6 (see FIG. 2). The strips 7 extend downwardly beyond the lower plate 6 and their lowermost ends carry coupling pins 8 that are substantially horizontally aligned in a direction that is substantially perpendicular, or at least transverse, to the direction A. As shown in FIGS. 1 and 2 of the drawings, the coupling pins 8 serve to connect the foot of the coupling member or trestle 3 pivotally to the free ends of the lower lifting links of the three-point lifting device or hitch carried by the agricultural tractor 4 or other operating vehicle. Two lugs 9 that have substantially inverse quadrilateral configurations when seen in side elevation (FIG. 2) are secured to the top surface of the upper plate 5 and it will be noted that a leading edge of each lug 9, with respect to the direction A, is inclined upwardly and forwardly relative to the same direction from the leading edge of said plate 5. The upper extremities of the two lugs 9 are perpendicularly interconnected by a substantially horizontal coupling shaft 10 that is arranged to cooperate pivotally with the rearmost end of the upper, adjustable length, lifting lirk of the aforementioned three-point lifting device or hitch, said rearmost end being arranged, as illustrated, turnably around the coupling shaft 10 at a location between the two lugs 9. A vertical plane of substantial symmetry of the tractor 4 or other operating vehicle that extends parallel to the direction A contains the longitudinal axis of the upper lifting link of its three-point lifting device or hitch and the two lugs 9 are spaced by short distances from opposite sides of this imaginary plane. The two coupling strips 7 are spaced from opposite sides of said imaginary plane by considerably greater distances but are nevertheless symmetrically disposed with respect thereto. Upper portions of the two lugs 9 both extend parallel to the imaginary vertical plane of substantial symmetry of the tractor 4 or other operating vehicle that has just been mentioned but the lower ends of said portions are bent over laterally in symmetrically opposite directions to form portions whose lower edges are secured to the top surface of the upper plate 5, this disposition effectively stiffening said plate 5. The lowermost edge of one of the lugs 9 extends towards the rearmost corner 11 of the substantially right-angled triangular upper plate 5 (see FIG. 1).

The rearmost corner 11 of the upper plate 5 and the corresponding corner of the lower plate 6 are rigidly interconnected by an upwardly extending and usually substantially vertical shaft 12A around which a sleeve 12 is freely turnable between the overlying upper plate 5 and the underlying lower plate 6, said shat 12A providing a rigid interconnection of the two plates 5 and 6 near their rearmost corners as do the coupling strips 7 at the two leading corners of both the two plates 5 and 6. The longitudinal axis of the shaft 12A is in parallel relationship with the axes of rotation of the two rake members 1 and 2. A further shaft 13A rigidly interconnects the upper and lower plates 5 and 6 at a location close to those leading corners of said two plates which are not of right-angled configuration, said shaft 13A being in parallel relationship with the shaft 12A and the axes of rotation of the two rake members 1 and 2. A sleeve 13 is turnable around the further shaft 13A between the overlying upper plate 5 and underlying lower plate 6 and serves a purpose which will hereinafter be described.

Rotary mountings for hubs of the two rake members 1 and 2 are rigidly interconnected by two hollow frame beams 14 and 15, said beams 14 and 15 being in forwardly convergent relationship, with respect to the direction A, from the rearmost ends thereof that adjoin said rotary mountings. In the example which is being described, the longitudinal axes of the two substantially, although not exactly, horizontally disposed beams 14 and 15 are inclined at an angle of 90°, or substantially 90°, to one another. It is emphasized, however, that an angle having a magnitude of other than substantially 90° may be enclosed between the longitudinal axes of the two beams 14 and 15. The point of intersection of the longitudinal axes of the two beams 14 and 15 is in advance, with respect to the direction A, of an imaginary line interconnecting the axes of rotation of the two rake members 1 and 2 and a substantially, but not exactly, horizontal plane that contains the longitudinal axes of the two beams 14 and 15 is perpendicular to the axes of rotation of both of said rake members 1 and 2. The two hollow frame beams 14 and 15 have equal lengths and, therefore, an imaginary triangle (as seen in FIG. 1) whose sides comprise the longitudinal axes of said two beams 14 and 15 and said line (not shown) that interconnects the axes of rotation of the two rake members 1 and 2 is an isoceles triangle whose apex angle has a magnitude of 90° or substantially 90°. The leading ends, with respect to the direction A, of the two frame beams 14 and 15 are rigidly interconnected by a gear box 16 most of which is sandwiched between the overlying upper plate 5 and the underlying lower plate 6, said gear box 16 having a rotary input shaft 17 that projects obliquely forwardly, with respect to the direction A, at the front of the gear box 16 with longitudinal axis substantially coincident with the longitudinal axis of the hollow frame beam 14. The obliquely forwardly projecting end of the rotary input shaft 17 is splined or otherwise keyed to enable it to be placed in driven connection with a rear power take-off shaft of the tractor 4 or other operating vehicle by way of an intermediate telescopic transmission shaft, that is of a construction which is known per se, having universal joints at its opposite ends. The telescopic transmission shaft which has just been mentioned is illustrated in FIGS. 1 and 2 of the drawings. Bevel pinions within the gear box 16 place the rotary input shaft 17 thereof in driving connection with two output shafts having longitudinal axes which are coincident, or substantially coincident, with the longitudinal axes of the two hollow frame beams 14 and 15. The two output shafts are coupled to driving shafts 18 and 19 respectively which driving shafts 18 and 19 extend axially through the interiors of the hollow frame beams 14 and 15. Alternatively, the output shafts of the gear box 16 may be unitary with the respective driving shafts 18 and 19. The ends of the driving shafts 18 and 19 that are remote from the gear box 16 carry bevel pinions which are located inside the rotary mountings for the hubs of the respective rake members 1 and 2. Each of said bevel pinions has its teeth in driving mesh with those of a larger crown wheel or bevel pinion 22 (for the rake member 1) or 23 (for the rake member 2). The crown wheel or bevel pinion 22 is rotatable around an upwardly extending shaft 20 that embodies the axis of rotation of the rake member 1 and, similarly, the crown wheel or bevel pinion 23 is rotatable around an upwardly extending shaft 21 that embodies the axis of rotation of the rake member 2.

Each of the two rake members 1 and 2 comprises four groups 82 that each exhibit two tines 83 and 84 that will be described in greater detail below. The tine groups 82 are arranged so as to be controllable in position by corresponding steering or control mechanisms that are associated with the respective rake members 1 and 2. The construction and operation of the two control steering or mechanisms is substantially identical and it is therefore only necessary to describe the construction and operation of the steering or control mechanism for one of said rake members in detail.

Referring particularly to FIGS. 3 and 4 of the drawings, it will be seen that the crown wheel or bevel pinion 23 that corresponds to the rake member 2 is fastened to a sleeve 24 in surrounding relationship with that sleeve. The longitudinal axis of the sleeve 24 is coincident with that of the corresponding shaft 21 and said sleeve, together with the crown wheel or bevel pinion 23, is rotatable around the shaft 21 due to the provision of axially spaced apart upper and lower ball bearings 25 and 26. The upper bearing 25 is restrained against axial displacement along the shaft 21 by the lower end of a sleeve 27 which closely surrounds said shaft and which is secured thereto by a pin 28 passed transversely through the shafts 21 and surrounding sleeve 27 close to the uppermost ends of both o them. A hood 29 is welded or otherwise rigidly secured to the external surface of the sleeve 27, said hood 29 having a cylindrical outer surface which protectively surrounds the crown wheel or bevel pinion 23 down to a level immediately above that of the bottom of said crown wheel or bevel pinion. The lowermost edge of the hood 29 has an outwardly projecting rim. The crown wheel or bevel pinion 23 is bolted to four underlying arms 30 and 35, there being two of the arms 30 that project in opposite directions and two of the arms 35 which also project in opposite directions that are perpendicular to those of the arms 30. However, it will be seen from FIGS. 3 and 4 of the drawings that none of the four arms 30 and 35 is arranged with its longitudinal axis in radial relationship with the longitudinal axis of the upwardly extending shaft 21.

It can be seen that FIG. 4 of the drawings that the rim at the foot of the hood 29 is spaced only a very short distance above the tops of the arms 30 and 35, said spacing being the minimum necessary to ensure that the rotary arms 30 and 35 do not foul the non-rotary hood 29 when the machine is in operation. The lower ball bearing 26 is retained against axial displacement along the shaft 21 by a ring 31 which surrounds said shaft 21 and that is fastened thereto by a transverse pin 32. It will be seen from FIG. 3 of the drawings that both the arms 30 and the arms 35 have quite short axial lengths, the outer free ends of the two opposed arms 30 being bent downwardly to have short substantially axially opposed sleeves 32A and 33, respectively, bolted to them. The substantially common longitudinal axis of the two sleeves 32A and 33 is perpendicular to, but does not intersect, the longitudinal axis of the upwardly extending shaft 21. The two sleeves 32A and 33 accommodate, or comprise, corresponding substantially horizontal bearings through which are entered a single tine carrier 34 in the form of a tubular beam. The tine carrier 34 extends throughout substantially the whole of the working diameter of the corresponding rake member 2 and is of uninterrupted unitary construction throughout its length.

The other pair of opposed arms 35 are bent downwardly at their outer ends to a lesser extent than are the arms 30 and it is preferred that, as illustrated, said arms 35 should be bent downwardly by a distance which is substantially equal to, or a little larger than, the external diameter of the tubular tine carrier 34. However, the outer and lower ends of the two arms 35 are similarly provided with aligned, or substantially aigned, sleeves 36 and 37 which sleeves are bolted to said arms. The sleeves 36 and 37 receive, or comprise, substantially aligned bearings in which a second tine carrier 38 is turnably mounted, said second tine carrier 38 being of substantially identical construction to the tine carrier 34 and thus comprising a tubular beam which extends throughout substantially the whole working diameter of the rake member 2 and which beam is of uninterrupted unitary construction throughout its axial length. As will be evident from FIGS. 3 and 4, in particular, of the drawings, the longitudinal axis of a central portion of the second tine carrier 38 is at a higher level than that of the first mentioned tine carrier 34, said longitudinal axes being perpendicular to each other and to the longitudinal axis of the shaft 21 with none of said three axes intersecting either of the other two. However, despite this relationship, it can be seen from FIG. 4 that the outer curved surfaces of the shaft 21, first tine carrier 34 and second tine carrier 38 are very close to one another, if not actually in contact, in the central region of the rake member 2 in which the longitudinal axes of the same parts are most closely adjacent. This relationship between the outer surfaces of the two tine carriers 34 and 38 and the outer surface of the shaft 21 can also clearly be seen in FIG. 7 of the drawings. The arrangement is intended to ensure that, when the machine is in operation, movements of the tine carriers 34 and 38 will not be prevented by each other nor by the shaft 21.

The relationship between the longitudinal axes of the shaft 21 and the central portions of the two tine carriers 34 and 38 that has been described above relates only to those central portions and it will be noted from the drawings that, outwardly beyond the respective sleeves 32A, 33, 36 and 37, the tubular beams that afford said carriers 34 and 38 are bent over in the same direction by a few degrees relative to the respective central portions. The tine carriers 34 and 38 are turnable in the bearings carried, or comprised by the sleeves 32A, 33, 36, and 37 but in a position in which the longitudinal axis of the central portion of the carrier 34 extends substantially perpendicular to the direction A, the outer portions thereof are inclined upwardly away from the central portion whereas, in a corresponding position of the central portion of the second carrier 38, its outer portions are inclined downwardly away from the central portion. The arrangement is such that, whichever of the two carriers 34 or 38 occupies the position in which its central portion is substantially perpendicular to the direction A, the tine groups 82 that are at the outer ends thereof will be at substantially the same height above the ground surface.

A transverse pin 40 secures a surrounding ring 39 to the shaft 21 at substantially the level of the bottom of the central portion of the tine carrier 34 and the lower end of said ring 39 abuts against the top of a mounting 41 of a surrounding circular swash plate 42, said swash plate 42 being of a basically flat formation despite the fact that it has a significant axial thickness. The mounting 41 surrounds the shaft 21 and a ring 47 forming part of the swash plate 42, in turn, surrounds the mounting 41 and is rotatably positioned on said mounting by way of a pair of adjoining ball bearings 46. The lowermost end of the mounting 41 abuts against the upper end of a support 43 which surrounds the shaft 21 and which is secured to that shaft by a further transverse pin 44. Lugs project from one side of the mounting 41 carry a spring-loaded locking pin 45 the tip of which can be entered in any chosen one of a curved row of holes (visible in broken lines in FIG. 3) that are equidistant from the longitudinal axis of the shaft 21. Said holes are formed in an upper plate 59 of the support 43 and it will be appreciated that the particular hole which is chosen for co-operation with the locking pin 45 determines the angular position of the swash plate mounting 41 about the longitudinal axis of the shaft 21.

The ring 47 of the swash plate 42 is a basically flat closed circular ring that is rotatably connected by the bearings 46 to the mounting 41. The ring 47 is freely rotatable around mounting 41 and its shape is such that the axis of free rotation of said ring 47 is inclined at an angle of substantially 60°, in the illustrated embodiment, to the longitudinal axis of the shaft 21. It can be seen from FIG. 4 of the drawings that the central portion of the mounting 41 around which the ring 47 of the swash plate 42 rotates is of substantially circular cylindrical configuration and that, in the example which is being described, when the locking pin 45 is engaged in the central one of the curved row of holes (FIG. 3) that are formed in the upper plate 59 of the support 43, the lowermost extremity of the ring 47 is contained in a substantially vertical plane that is perpendicular to the direction A and that also contains the longitudinal axis of the shaft 21, said lowermost extremity then being located at that side of the shaft 21 which is remote from the central shaft 20 of the other rake member 1.

The ring 47 of the swash plate 42 is formed with two internally screwthreaded holes that both extend substantially radially with respect to the axis of free rotatability of said ring. Corresponding externally screwthreaded rods 48 are engaged in the screwthreaded holes and are provided with lock nuts 49 to ensure that any chosen position of extension of one of the rods 48 from the corresponding hole can be maintained. Each hole forms a control part of the ring 47 for at least one of the tine groups 82. The outer end of each externally screwthreaded rod 48 carries a ball 50 and said balls 50 co-operate with corresponding blocks 51 and 52 (FIGS. 4 to 6) to form universal ball and socket joints, the balls 50 being universally turnable in substantially spherical cavities that are formed inside said blocks 51 and 52. The blocks 51 and 52 are adjustably connected by screwthreaded rods, screwthreaded bores and lock nuts to sleeves which turnably surround corresponding pivot bolts 53 and 54 that interconnect pairs of arms 55/56 and 57/58, respectively, said arms being welded or otherwise rigidly secured to the central portions of the respective first and second tine carriers 34 and 38.

The location at which the screwthreaded rod 48 that is universally coupled to the block 51 adjustably engages the ring 47 of the swash plate 42 is spaced apart by 90° around the axis of free rotation of that ring from the location at which the other rod 48 (universally connected to the block 52) is adjustably connected to the ring. Thus, said two locations are spaced apart one behind the other by 90° relative to the intended direction of operative rotation C (FIGS. 1, 3 and 7) of the rake member 2 and relative to the intended direction of rotation B (FIG. 1) in the case of the symmetrically similar or identical rake member 1. In addition to its upper plate 59, the support 43 comprises a parallel but downwardly spaced lower plate 60, the two plates 59 and 60 being rigidly interconnected by a rim 61, the upper and lower edges of which are welded or otherwise rigidly secured to the corresponding plates 59 and 60. The plates 59 and 60 project forwardly with respect to the direction A from the rim 61 and have a substantially horizontal axle shaft 62 welded or otherwise rigidly secured to their leading edges. The longitudinal axis of the axle shaft 62 extends transverse, and usually substantially perpendicular, to the direction A and, as viewed in that direction from the rear of the machine, or in the opposite direction from the front of the machine (FIG. 8), the axle shaft 62 extends by equal distances to the opposite sides of the shaft 21. Actually, FIG. 8 illustrates the rake member 1 which has the central upwardly extending shaft 20 but it will be remembered that the rake member 1 is symmetrically identical, or similar, to the rake member 2 as are the parts that are associated therewith. Each half of the axle shaft 62 carries two axially spaced apart ball bearings 63 and 64 and substantially vertical end plates 65 that are perpendicular to the longitudinal axis of the shaft 62 are rotatably connected to the shaft 62 by said bearings 63 and 64. The end plates 65 form parts of a cylindrical roller 66 that affords one of two supporting members 67 of the machine. As can be seen in FIG. 8 of the drawings, each roller 66 is releasably retained in rotary connection with the corresponding end of the shaft 62 by a bolt and incorporates shield members arranged to prevent external dirt from contaminating the ball bearings 63 and 64. Thus, each of the two rake members 1 and 2 has two of the supporting members 67 which are arranged symmetrically at opposite sides of a substantially vertical plane that extends parallel to the direction A and that contains the longitudinal axis of the corresponding shaft 20 or 21. This is not, however, essential and each of the two rake members 1 and 2 may be associated with only a single one of the supporting members 67. When, as illustrated, the supporting members 67 are in the form of the cylindrical rollers 66, it is preferred that, with this latter arrangement, the two rollers 66 (in total) of the machine should be located at those sides of the two imaginary substantially vertical planes that extend in the direction A and that contain the longitudinal axes of the corresponding shafts 20 and 21 which are remote from one another. The supporting members 67 could, as a further alternative, be in the form of ground wheels of known construction rotatably mounted on the axle shafts 62 and, with any of these possible arrangements, means (not shown) may be provided to displace the supporting members 67 bodily around the axes of the corresponding shafts 20 and 21, said means incorporating parts arranged to maintain any chosen positions of such adjustment. When the axes of rotation of the supporting members 67 are not substantially perpendicular to the direction A, the central shaft 20 or 21 of one of the two rake members 1 and 2 will be in advance of the other shaft with respect to the direction A.

Upper and lower plates 68 and 69 (FIGS. 3 and 6) project obliquely rearwardly with respect to the direction A from a rearwardly facing portion of the cylindrically curved wall of the hood 29, said plates 68 and 69 being of substantially the same size and being in registeringly spaced relationship with one another in a direction parallel to the longitudinal axis of the shaft 21. The upper and lower plates 68 and 69 are rigidly interconnected at two spaced locations by pivot shafts 72 and 73 that both extend parallel to the shaft 21, corresponding sleeves 70 and 71 being arranged in a freely turnable manner around said shafts 72 and 73 between the overlying plate 68 and the substantially identical underlying plate 69. As seen in plan view (FIGS. 1 and 3), an imaginary line interconnecting the longitudinal axes of the two pivot shafts 72 and 73 that correspond to the rake member 2 extends rearwardly from its point of intersection with a further imaginary straight line interconnecting the longitudinal axes of the two shafts 20 and 21, an angle of substantially 40° being enclosed between these imaginary lines at said point of intersection thereof. Two parallel rods 74 and 75 have their leading ends, with respect to the direction A, rigidly secured to the sleeves 70 and 71 respectively so as to extend in perpendicular relationship with those sleeves. The two rods 74 and 75 are of equal lengths and their rearmost ends, with respect to the direction A are coupled by corresponding pivot pins 77 and 78 to locations on a coupling bracket 76. The pivot pins 77 and 78 are in parallel relationship with the pivot shafts 72 and 73 and are spaced apart from one another, on the coupling bracket 76, by the same distance as are the pivot shafts 72 and 73 on the upper and lower plates 68 and 69. A pivotable quadrilateral linkage is thus formed which, in the example that is being described, is a parallelogram linkage which ensures that a plane containing the longitudinal axes of the two pivot shafts 72 and 73 remains in parallel relationship with a plane containing the longitudinal axes of the two pivot pins 77 and 78 despite angular displacement of the rods 74 and 75 about the axes of said pivot shafts 72 and 73. It is emphasized that whilst a parallelogram linkage is employed in the example that is being described, this is not essential and other pivotable quadrilateral linkages that do not maintain parallelism can be used as alternatives.

The coupling bracket 76 is connected to the upright limb of a substantially L-shaped swath board holder 79 (FIG. 2) in such a way as to be upwardly and downwardly displaceable relative to that limb without being angularly turnable with respect thereto. This co-operation can be brought about by employing splines or at least one other keyway (not shown). The swatch board holder 79 supports a swath board 80 that is afforded principally by a plurality of spring steel rods arranged to extend freely rearwardly with respect to the direction A from the upright limb of the holder 79 in parallel or substantially parallel, but spaced, relationship with each other. The lower substantially horizontal limb of the holder 79 is arranged to slide forwardly over the ground surface during operative progress of the haymaking machine in the direction A and the form of connection of the upright limb of the same holder to the coupling bracket 76 that has been described above enables the whole holder 79, together with the swath board 80 which it carries, to move upwardly and downwardly with respect to the coupling bracket 76 to match irregularities and undulations in the surface of the ground which it may meet during progress in the direction A. A second swath board 80 is indirectly connected to the hood 29 associated with the other rake member 1 in a substantially symmetrically indentical manner to that which has just been described for the swath board 80 that corresponds to the rake member 2. The angularity of the two parallelogram linkages which comprise the corresponding rods 74,75 can be fixed in chosen ones of corresponding attitudes to maintain the respective swath boards 80 in corresponding positions and, to this end, rods or strips 73A (FIG. 3) are turnably mounted on the corresponding pivot shafts 73, or their surrounding sleeves 71, and are provided at the extremities thereof which are remote from said shafts 73 with locking pins 73B that can enter any chosen ones in rows of holes 73C that are formed through elongate strips 74A which are welded or otherwise rigidly secured to the sides of the rods 74 that face the companion rods 75. The parts 73A and 74A are omitted from FIG. 6 of the drawings for the sake of simplicity.

The four open ends of the two tubular tine carriers 34 and 38 have corresponding sheet metal tine holders 81 (FIG. 8) welded into them. Preferably, as illustrated, the tine holders 81 are inclined outwardly and donwardly by a few degrees from the ends of the respective carriers 34 and 38 and each of them advantageously, but not essentially, intersects a corresponding radial plane that contains the longitudinal axis of the respective shaft 20 or 21. Each of the tine holders 81 has one of the aforementioned tine groups 82 fastened to it, each tine group 82 comprising, in this embodiment, the two similar tines 83 and 84. FIGS. 6 and 8 of the drawings illustrate the tines 83 and 84 in detail and it will be seen therefrom that each tine has a hay-engaging free end portion 85 of rectilinear configuration which is connected by a bend to a corresponding rectilinear support portion 86. The angle that is enclosed between each end portion 85 and the corresponding support portion 86 at the junction there between has a magnitude of substantially 120° (see FIG. 6). The extremity of each support portion 86 which is remote from the corresponding end portion 85 is connected to one end of a helical coil 87 that comprises a plurality of complete 360° turns. Advantageously, as illustrated, the two tines 83 and 84 of each group 82 are formed from a single length of spring steel or other resilient rod material which thus comprises the two end portions 85, the two support portions 86 the two coils 87 and a single fastening portion 88 which integrally interconnects the ends of the two coils 87 that are remote from the two support portions 86, said fastening portion 88 being releasably secured to the corresponding tine holder 81 by a clamping plate and a bolt or the like. It is advantageous to form the tine holders 81 from a resilient sheet metal of a thickness whereby it is torsionally deformable during operation of the machine so that the holders 81, as well as the coils 87, contribute to the resilient support of the end portions 85 of the tines 83 and 84 which actually engage the hay and which are therefore subject to friction, inertia forces and the like that oppose displacement of the hay. The shape of each tine group 82 is such that, when the corresponding tine carrier 34 or 38 has been turned as far as is possible in one direction about the longitudinal axis of its central portion during operation of the machine, the end portions 85 of the two tines of said group 82 will be in perpendicular or substantially perpendicular relationship with a substantially horizontal plane approximately containing the ground surface. Under these circumstances, the support portions 86 of the two tines concerned are inclined upwardly and forwardly from the end portions 85 to the coils 87 with respect to the direction of rotation B or C of the rake member 1 or 2 of which the tine group under discussion forms a part. The circumstances which have just been discussed exist for the single tine group 82 that is illustrated in FIG. 6 of the drawings. When the tine carrier which supports the same tine group 82 has been turned about the longitudinal axis of its central portion in the opposite direction as far as is possible during the use of the machine, the tine end portions 85 will be substantially horizontally disposed and the corresponding support portions 86 will be inclined downwardly and forwardly therefrom, with respect to the direction B or C, towards the respective coils 87.

The freely turnable sleeve 12 that can be seen in FIGS. 1 and 2 of the drawings has a substantially trapezoidal stiffening plate 89 fastened to it, the non-parallel edges of said plate 89 being welded to the hollow frame beams 14 and 15 close to the leading ends of those two beams that are rigidly interconnected by the gear box 16. A rod 90 projects perpendicularly from the sleeve 13 that is turnable about the shaft 13A, the end of said rod 90 that is remote from the sleeve 13 being provided with a fork that is connectible by a substantially vertical locking pin (FIGS. 1, 2 and 6) to an apertured lug 91 or to an alternative apertured lug 92 (FIG. 1). The lug 91 is fastened to the frame beam 15 close to the end of that frame beam which is remote from the gear box 16 whereas the lug 92 is secured to the frame beam 15 substantially midway along the length of the latter. The rod 90 is shown connected to the lug 91 in the drawings and thus prevents the frame beams 14 and 15, together with the rake members 1 and 2, from pivoting about the axis that is defined by the shaft 12A, the illustrated position being a working position of the implement. In order to couple the fork at the end of the rod 90 to the lug 92 instead of to the lug 91, it is first necessary to disconnect said fork from the lug 91 and to turn the frame beams 14 and 15 and the rake members 1 and 2 which they carry in an counterclockwise direction, as seen in FIG. 1 of the drawings, about the axis defined by the shaft 12A until the fork as the end of the fixed length rod 90 will register with said lug 92. These circumstances define a different position of the frame beams 14 and 15 and the rake members 1 and 2 relative to the coupling member or trestle 3 of the machine, said different position being either a reduced width position that is suitable for the inoperative transport of the machine or a further working position.

Figure 9:
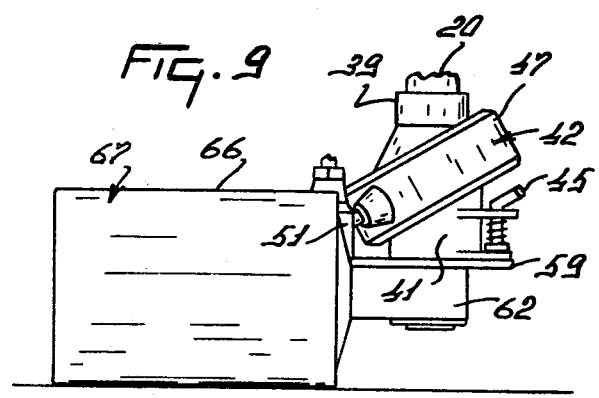
FIG. 9 is a front elevation illustrating an alternative embodiment of certain parts to that which is illustrated in FIG. 8.

FIG. 9 of the drawings illustrates one of the alternative arrangement of the rollers 66 that afford the supporting member 67 that has been briefly discussed above. In the embodiment of FIG. 9, the lowermost end of each of the two shafts 20 and 21 has a corresponding axle shaft 62 turnably connected to it with the aid of the upper plate 59 alone, the lower plate 60 being omitted. The axle shaft 62 projects laterally with respect to the direction A to only one side of a plane that is parallel to said direction A and that contains the longitudinal axis of the associated shaft 20 or 21, said side being the one that is remote from a further imaginary substantially vertical plane that extends parallel to the direction A midway between the two shafts 20 and 21. Thus, the machine is provided with a total of only two of the cylindrical rollers 66, instead of a total of four thereof as illustrated in the embodiment of FIGS. 1 to 8 of the drawings, each of the two rollers 66 being rotatably mounted on a corresponding axle shaft that is only approximately half the length of each axle shaft 62 in the embodiment of FIGS. 1 to 8.

Figure 10:
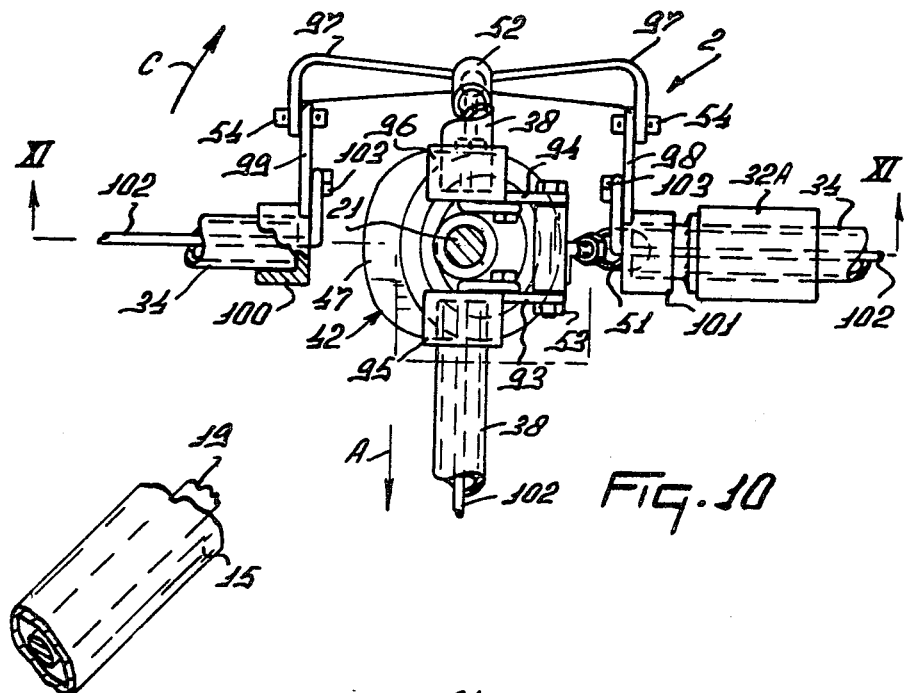
FIG. 10 is a section taken on the line VII—VII in FIG. 6 but illustrates the construction of an alternative form of haymaking machine in accordance with the invention.
Figure 11:
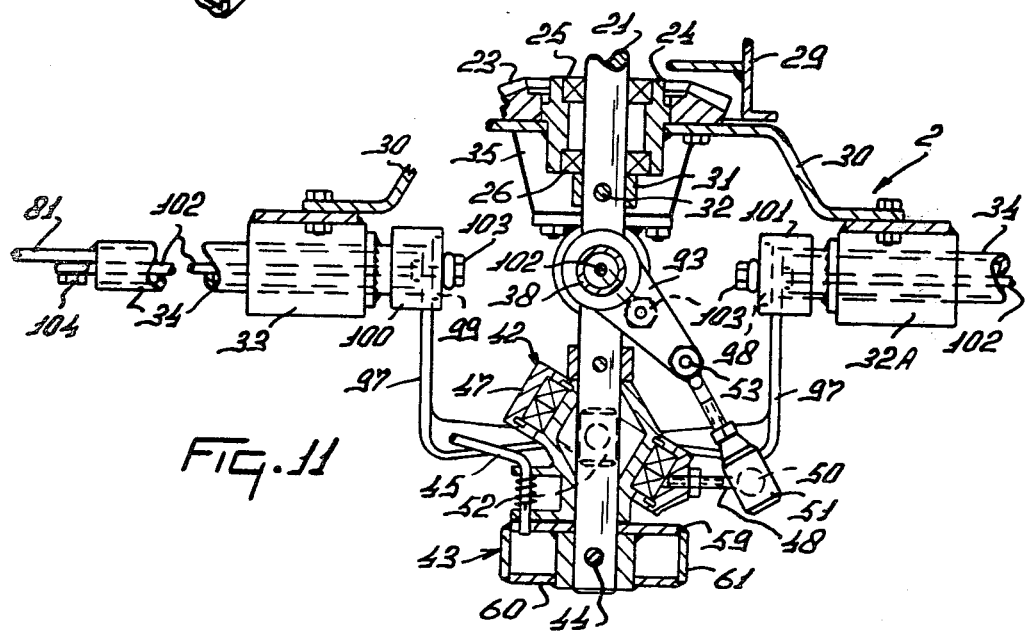
FIG. 11 is a section taken on the line XI—XI in FIG. 10.

FIGS. 10 to 11 of the drawings illustrate an alternative embodiment in which the two tine carriers 34 and 38 are not in perpendicularly crossing relationship, as seen in plan view, very close to the shaft 21 but in which, instead, the three mutually substantially perpendicular axes all intersect at a single point. With this construction, each of the two tine carriers 34 and 38 is not of integral construction but is divided into two separate portions, the neighboring ends of the two portions being spaced apart from one another with the shaft 21 intervening between them. In this embodiment, the arms 30 and 35 are bent downwardly through equal distances and the sleeves 32A, 33, 36 and 37 which they carry are of heavier construction and considerably augmented in axial length as compared with the corresponding sleeves in the embodiment of FIGS. 1 to 8.

The block 51 is coupled by way of the pivot bolt 53 to two extension arms 93 and 94 having their ends which are remote from the pivot bolt 53 fastened to project from corresponding cylindrical sleeves 95 and 96. The internal surfaces of said sleeves 95 and 96 closely surround the matchingly curved outer surfaces of the inner ends of the two separate portions of the second tine carrier 38, the sleeves 95 and 96 and the two halves of the carrier 38 being relatively turnable about their common longitudinal axis. Two substantially symmetrically identical brackets 97 are rigidly connected to opposite sides of the block 52 and include bent portions that are turnably connected to respective extension arms 98 and 99 by substantially horizontally aligned but spaced apart pivots 54 (FIG. 10) which take the place of the pivot bolt 54 in the first embodiment. The extension arms 98 and 99 are rigidly secured to sleeves 101 and 100, respectively, said sleeves being turnably mounted on the corresponding two portions of the first tine carrier 34 in a similar manner to that which has already been described for the co-operation between the sleeves 95 and 96 and the two portions of the second tine carrier 38.

A spring steel torsion rod 102 extends substantially axially through the interior of each of the two separate portions of each of the two tine carriers 34 and 38, said rods 102 being passed through holes formed in end walls of the respective sleeves 95, 96, 100 and 101. The rods 102 are bent through 90° immediately beyond the holes in the end plates of the sleeves and the bent ends are firmly secured to the respective extension arms 98, 99 100 and 101 by bolts 103. The ends of the torsional rods 102 that are remote from the bolts 103 are firmly secured by further bolts 104 (FIG. 11) to the sheet metal tine holders 81, said holders 81 being welded into the outer ends of the tubular tine carriers 34 and 38 as described above.

Figure 12:
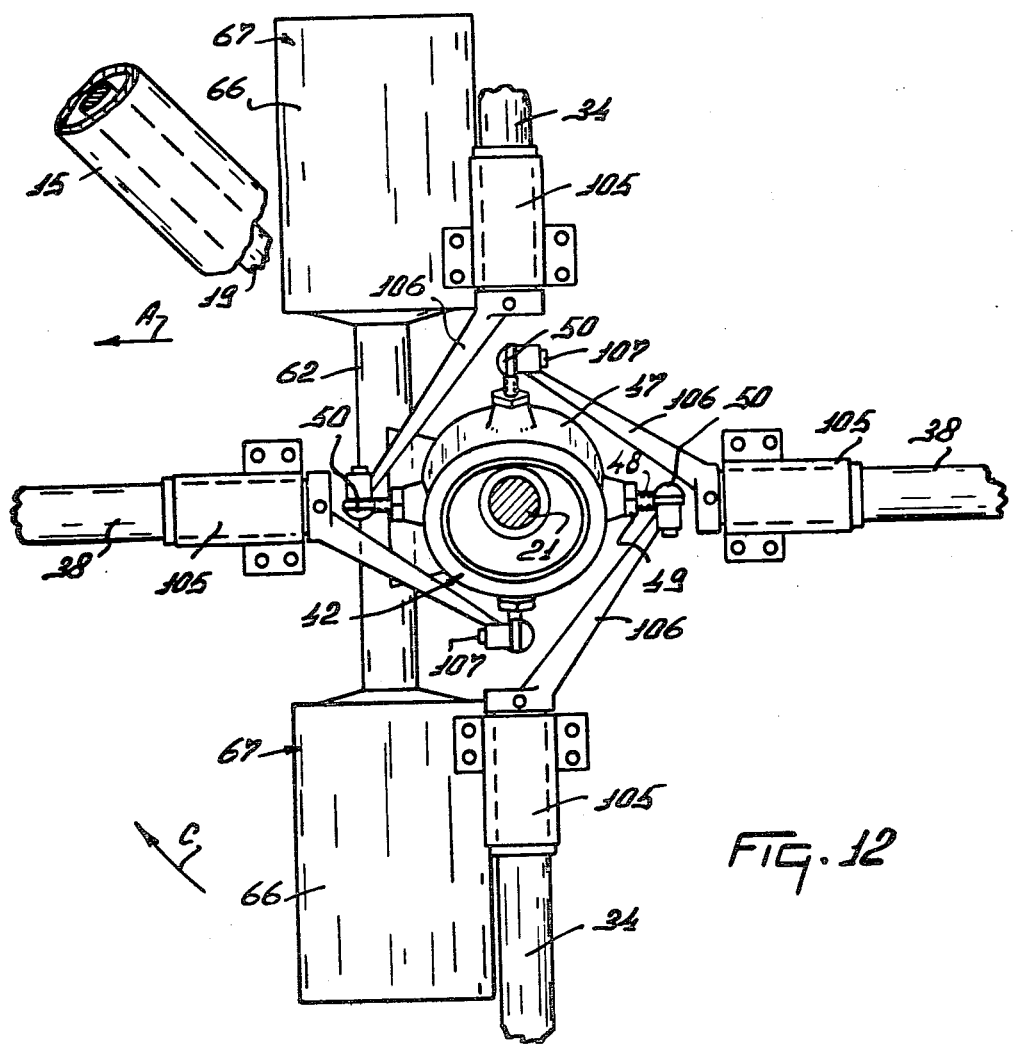
FIG. 12 is again a section taken on the line VII—VII in FIG. 6 but illustrates the construction of a third form of haymaking machine in accordance with the invention.

FIG. 12 of the drawings illustrates a further alternative embodiment in which, as in the embodiment of FIGS. 10 and 11, both the tine carrier 34 and the tine carrier 38 are each divided into two portions that lie at opposite sides of the intervening and relatively perpendicular shaft 21. Since the two halves or portions of the carrier 34 are substantially uniplanar with the two halves or portions of the carrier 38, there is no need for outer portions of said carriers to be bent relative to a central portion as is desirable in the embodiment of FIGS. 1 to 8. This consideration applies in a like manner to the embodiment of FIGS. 10 and 11. Once again, the common longitudinal axis of the two halves or portions of the tine carrier 34, the common longitudinal axis of the two halves or portions of second tine carrier 38 and the longitudinal axis of the shaft 21 are mutually substantially perpendicular and all intersect at a single point, the halves or portions of the carriers 34 and 38 being radially disposed with respect to the shaft 21 as in the embodiment of FIGS. 10 and 11.

In the embodiment of FIG. 12 of the drawings, the ring 47 that forms part of the swash plate 42 is provided at four locations around its outer surface with a corresponding number of screwthreaded rods 48 which each have one of the balls 50 at their outer ends. The four locations are spaced apart from one another at regular 90° intervals around the axis of free rotatability of the ring 47. As viewed in a direction lengthwise of the axis of the shaft 21 (FIG. 12), the longitudinal axis of each half or portion of each of the two tine carriers 34 and 38 intersects a respective one of the four balls 50. However, inner end regions of the four tine carrier halves or portions are turnably journalled in corresponding bearings 105 and each such half or portion is provided, immediately alongside the bearing 105 concerned, with a rigidly mounted obliquely projecting arm 106. The end of each arm 106 that is remote from the corresponding tine carrier half or portion 34 or 38 is provided with a pivotal shaft 107 that is in tangential relationship with an imaginary circle centered upon the axis of rotation of the shaft 21. In this embodiment, there are four, rather than two, of the blocks 51 and 52 and the upper ends of said blocks are turnably connected to the pivotal shafts 107 in the same manner as, in the first embodiment, the two blocks 51 and 52 are turnable about the pivot bolts 53 and 54. The four blocks 51 and 52 form universal ball and socket joints with the four balls 50. It will be noted that the four arms 106 extend obliquely rearwardly from the inner ends of the corresponding tine carrier halves or portions 34 and 38 with respect to the intended direction of operative rotation C of the rake member 2 and similarly, in the case of the rake member 1, rearwardly with respect to the intended direction of operative rotation B of that rake member so that, in fact, each tine carrier half or portion 34 or 38 is coupled to the ring 47 of the swash plate 42 at a location which is angularly spaced rearwardly by 90° (with respect to the direction B or C) from a location at which the longitudinal axis of the half or portion under consideration intersects (as seen in the plan view of FIG. 12) the swash plate 42.

In the use of the haymaking machine which has been described with reference to FIG. 1 to 8 of the accompanying drawings, the rotary input shaft 17 of the gear box 16 is placed in driven connection with the power take-off shaft of the tractor 4 or other operating vehicle by way of the illustrated telescopic transmission shaft that is of a construction which is known per se having universal joints at its opposite ends. The coupling pins 8 and coupling shaft 10 are employed to connect the coupling member or trestle 3 of the machine to the three-point lifting device or hitch at the rear of the same tractor 4 or other operating vehicle. As the machine moves forwardly in the direction A over a field of hay or other crop that is lying upon the ground in the working position that is illustrated in which the fork at the rear end of the rod 90 is coupled to the lug 91, the two rake members 1 and 2 are caused by the respective driving shafts 18 and 19 to rotate in the opposite directions B and C which directions are such that, in a region of overlap between the two rake members that is midway between the two shafts 20 and 21, successive tine groups 82 of the two rake members move rearwardly with respect to the direction A towards the gently rearwardly convergent swath boards 80 (see FIG. 1). Hay or other crop displaced by the tine groups 82 towards the swath boards 80 is formed by those swath boards into a swath or windrow, the width and height of which can be adjusted by changing the angularity of either one, or both, of the two parallelogram linkages which comprise the respective pairs of rods 74,75 and the coupling brackets 76. It will be apparent that the position of either swath board 80 can be adjusted relative to the remainder of the machine independently of the other swath board 80 and that the width of the passage between the two swath boards can be increased, or decreased, as may be required to vary the cross-sectional shape of the swath or windrow of hay or other crop that the machie is to form. Thus, said passage can be symmetrical or offset to either the right or the left with respect to an imaginary vertical plane that extends parallel to the direction A midway between the shafts 20 and 21 and, since the two swath boards 80 are both connected to the corresponding plates 68 and 69 by parallelogram linkages, the attitudes thereof relative to the imaginary plane that has just been mentioned will remain the same no matter what the width of the passage that they define or their position of symmetry, or asymmetry, relative to said plane. As previously mentioned, it is possible to use quadrilateral linkages that are not parallelogram linkages and, in such cases, the attitudes of the swath boards 80 to the direction A can be varied in a predetermined manner. For example, the pivotable quadrilateral linkages could be so arranged that the two swath boards 80 could be rendered more or less convergent, considered rearwardly of the direction A, by changing their angularities.

In the embodiment of FIGS. 1 to 8 of the drawings, the angular position of each of the two tine carriers 34 and 38 of each rake member about the longitudinal axis of its own central portion is determined by the horizontal level of the corresponding block 51 or 52 and that level is determined by the angular position, at any given time, of each block around the corresponding swash plate 42. FIG. 6 illustrates a position, which may be considered for the sake of discussion as being a starting position, in which the tine group 82 that corresponds to the second tine carrier 38 and that is located rearmost (at that time) with respect to the direction A (see FIG. 1 and 2) is so disposed that the end portions 85 of its two tines 83 and 84 are horizontally or substantially horizontally orientated. The corresponding block 51 is, at this instant, at its lowermost level around the respective swash plate 42 (see FIG. 4, 5 and 6) and, upon continued rotation of the rake member 2 in the direction C. The ring 47 of said swash plate will be moved in the same direction around the remainder of that swash plate, by the block 51, towards a position in which said block and the portion of the ring 47 to which it is connected are at their foremost possible locations with respect to the direction A. When this latter position is reached, the block 51 will be midway between the lowermost and uppermost levels which it can attain relative to the remainder of the machine. The upward movement of the block 51 from its lowermost position to its intermediate position causes the end portions 85 of the tines of the tine group 82 under discussion to move from their substantially horizontal dispositions generally downwardly until their longitudinal axes are inclined at an angle of substantially 70° to the horizontal ground surface If the central shaft 21 of the rake member 2 were to be strictly vertically disposed, the extremities of the tine end portions 85 under discussion would not yet have come into contact with the ground surface assuming that, with such an arrangement, they would make contact with the ground surface when the tine group 82 was in substantially its foremost possible position with respect to the direction A.

As the rake member 2 turns further in the direction C, the block 51 that corresponds to the second tine carrier 38 also moves forwardly in said direction and upwardly around the swash plate 42 because of its connection to the rotating ring 47 of that swash plate. It thus reaches a position in which it is at its highest possible level with respect to the remainder of the machine and the dimensions of the various parts are such that, when this position is reached, the end portions 85 of said two tines 83 and 84 will be in perpendicular or substantially perpendicular relationship with the ground surface, the tine group 82 then being at its foremost possible position with respect to the direction A. The dimensions of the various parts will usually be chosen so that the extremities of the end portions 85 of the tines of the group 82 under discussion will be in contact with the ground in the foremost position of the tine group 82, relative to the direction A, around the shaft 21 that has just been discussed and, with this arrangement, when the tine carrier 38 extends substantially perpendicular to the direction A, the end portions 85 of said tines 83 and 84 will be just clear of contact with the ground. It is desirable that said end portions 85 should remain in contact with the ground over a portion of the circular path of the tine group 82 around the shaft 21 which is of as large a magnitude as possible (preferably substantially 180°) and, to this end, the shaft 21 is so disposed that its longitudinal axis (the axis of rotation of the rake member 2) is inclined upwardly and rearwardly with respect to the direction A. The extent of the deviation from the true vertical should therefore be such that, when the block 51 corresponding to the tine group 82 under discussion is in either of its two intermediate positions between the lowermost and uppermost horizontal levels which it can attain, the extremities of the end portions 85 of the two tines 83 and 84 are just coming into contact with, and are just losing contact with, respectively, the ground surface, said extremities remaining in contact with that surface throughout the substantially 180° arc of their movement around the shaft 21 which is in advance of that shaft with respect to the direction A. Generally speaking, the rearward inclination of the longitudinal axes of the shafts 20 and 21 to the true vertical should not be more than substantially 20°. The actual magnitude of this inclination in any particular case is determined by the inclination of the plane of rotation of the ring 47 of the corresponding swash plate 42 to the axis of the shaft 20 or 21 concerned, to the size of the swash plate 42, to the dimensions of the tines 83 and 84 and to the dimensions of the part which interconnect the rings 47 and the respective tine carriers 34 and 38.

As the tine carrier 38 turns further in the direction C away from the position in which the tine group 82 under discussion is at the front of the rake member 2 with respect to the direction A and the corresponding block 51 is at its highest possible horizontal level with respect to the remainder of the machine, said tine carrier reaches a position in which it is substantially perpendicular to the direction A and the block 51 is in the intermediate position around the swash plate 42 in which it is still descending but is at the rear of said swash plate with respect to the direction A. The tine group 52 is turned back upwardly during its movement between these two positions and, when the latter position is attained, it is again disposed with the end portions 85 of its tines obliquely inclined to the horizontal at an angle of substantially 70°, the extremities of said tines still being in contact with the ground surface but, ideally, just on the point of losing contact therewith. The end portions 85 of the tines are able to maintain contact with the ground surface, at a light pressure, during their passage through a leading, with respect to the direction A, arc of their movement around the axes of the respective shaft 20 and 21 because they are connected to the respective carriers 34 and 38 in a very resilient manner by the spring steel or other resilient support portions 86, the resilient coils 87 and the tine holders 81 which, as discussed above, are advantageously of a torsionally deformable construction. FIGS. 6 and 8 of the drawings show that the lengths of the end portions 85 and support portions 86 are such that the former portions are able to exert a significant turning moment upon the coils 87 and tine holders 81 when said end portions are urged upwardly by their contact with the ground surface or with any obstacles that may be lying thereon or protruding therefrom.

During the last 90° of angular displacement of the tine group 82 under discussion around the axis of the shaft 21 towards the starting position discussed above, the block 51 moves from the intermediate position in which it is at the rear of the swash plate 42 with respect to the direction A downwardly towards the lowermost horizontal level which it can attain. Thus, the tine group 82 is turned farther upwardly about the axis of the central portion of its carrier 38 until the starting position is again reached in which starting position the end portions 85 of the two tines of said group are horizontally or substantially horizontally disposed. The positions which the tine group 82 occupy at various angles around the axis of rotation of the rake member 2 are substantially symmetrical with respect to an imaginary vertical plane that extends parallel to the direction A and that contains said axis of rotation (i.e. the longitudinal axis of the shaft 21). A machine in accordance with the invention may be constructed in the manner that is illustrated in FIGS. 1 through 8 which is such that, as seen in plan view, the circles that are traced by the tips of the outermost tines of the two rake members 1 and 2 overlap one another midway between the shaft 20 and 21. Such overlap is often desirable but it is emphasized that it is by no means essential and that the two rake members 1 and 2 could equally well be spaced apart by a greater distance so that said circular paths would not overlap one another as seen in plan view.

The haymaking machine that has been described with reference to FIGS. 1 to 8 of the drawings, with or without the modification of FIG. 9, provides a particularly simple way of controlling the attitude of the tines to the ground surface during movements of those tines through circular paths. Each steering or control mechanism is afforded principally by a basically planar swash plate and it has been found that the use of such swash plates is superior to the employment of known rollers and roller tracks for the same purpose since the swash plates 42 are less expensive, longer lasting and considerably quieter in operation. The tine carriers 34 and 38 can have the simple construction that has been described and that is illustrated in the accompanying drawings, said carriers being mounted so as to be turnable about the longitudinal axes of their central portions merely by way of the lightweight sleeves 32A and 33 and the aligned bearings which form parts of those sleeves or which the sleeves carry. The upward and rearward, with respect to the direction A, oblique disposition of the axis of rotation of each of the two rake members 1 and 2 enables the tines of both rake members to maintain operative contact with the ground surface throughout a leading substantially 180° arc of movement of each tine group around the corresponding axis of rotation and this is a most desirable attribute having regard to an effective raking action of the machine throughout a broad working width.

In the embodiment of FIGS. 10 and 11 of the drawings, each of the two tine carriers 34 and 38 is divided into two halves or portions, the corresponding shaft 20 or 21 intervening between the two halves or portions of each tine carrier at the center of the rake member concerned. Due to the divided construction of each tine carrier, this embodiment has the advantage that all four of the tine carrier halves or portions of each of the two rake members 1 and 2 act successively in the same way during rotation of the corresponding rake member in the direction B or C. As in the first embodiment, the end portions 85 of the tines 83 and 84 of each group 82 are maintained substantially continuously in contact with the ground surface face throughout a leading, with respect to the direction A, arc of their rotation in the direction B or C, said arc advantageously having an angular magnitude of substantially 180°. Thus, once again, the machine is able to perform an effective raking action throughout a working width that is substantially equal to the combined width of the two rake members 1 and 2 in a horizontal direction that is perpendicular to the direction A. The tine groups 82 are controlled from the swash plates 42 via the blocks 51 and 52 in a manner that is substantially identical to that which has already been described with reference to the embodiment of FIGS. 1 to 8 of the drawings, only the parts which couple said blocks 51 and 52 to the divided tine carriers 34 and 38 being of a different construction and arrangement to those of the first embodiment.

The resilient construction of the tine groups 82 and their resilient connection to the carriers 34 and 38 is again effective in ensuring that the end portions 85 of the tines will remain in contact with the ground surface at a light pressure during the movement of the tines through their leading, with respect to the direction A, arcs of travel around the axes of the corresponding shafts 20 and 21. However, in the embodiment of FIGS. 10 and 11 of the drawings, this resilient contact of the tine end portions 85 with the ground surface is augmented by the fact that the tine carriers 81 are resiliently coupled to the extension arms 93, 94, 98 and 99 by the torsionally deformable rods 102. The blocks 51 and 52 turn the four extension arms that have just been mentioned upwardly and downwardly about the axes of the respective tine carriers 34 and 38 but such turning movements are transmitted to the tine carriers themselves, and thus to the tine groups 82, through the intermediary of the torsionally deformable rods 102 so that an additional resilient element is interposed between each tine group 82 and the corresponding swash plate 42. Both vertically and horizontally extending forces that may be exerted upon the tine groups 82 are resisted by the effectively resilient tine carrier halves or portions 34 and 38 and are transferred by the sleeves 32, 33, 36 and 37 to the central hub of the rake member 1 or 2 concerned.

In the first embodiment of FIGS. 1 to 8 of the drawings, the two tine groups 82 that correspond to each carrier 34 and 38 are angularly offset relative to one another, about the axes of the corresponding outer portions of the carrier concerned, by an angle of substantially 90°. In the embodiment of FIG. 12 of the drawings, the end portions 85 of the tines 83 and 84 follow substantially the same paths as are shown by irregularly broken lines in FIG. 2 of the drawings by the use of tine carriers 34 and 38 that are in divided form, each half or portion of each carrier 34 and 38 being individually controlled. As described above, the four blocks that control the four tine carrier halves or portions in each of the two rake members 1 and 2 are angularly spaced apart from one another at regular 90° intervals around the axis of free rotatability of the corresponding swash plate ring 47, each block being 90° behind (as seen in FIG. 12) the tine carrier half or portion which it controls with respect to the direction of rotation B or C.

In the cases of the two embodiments of FIGS. 10 to 12 of the drawings, it is possible to ensure that the end portions 85 of the tines 83 and 84 of each group 82 will remain reliably in contact with the ground surface during their movement through a leading, with respect to the direction A, substantially 180° arc of angular displacement about the corresponding shaft 20 or 21 by bending outer portions of the divided tine carriers 34 and 38 downwardly with respect to the axes that are defined by the corresponding pairs of bearing sleeves 32A, 33 and 36, 37, as compared with positions in which, as seen in plan view, the successive tine carrier portions or halves extend substantially rectilinearly rearwards with respect to the direction A from locations adjacent the corresponding shafts 20 and 21. With this bent type of construction, the longitudinal axis of each successive tine carrier half or portion, when in the position that has just been described, is contained in a plane which also contains the longitudinal axis of the corresponding shaft 20 or 21 and the axis defined by the respective sleeve bearings 32A, 33 or 36, 37. As each such tine carrier half or portion moves forwardly from this rearmost position in either the direction B or the direction C, its connection to the ring 47 of the respective swash plate 42 causes it to be angularly displaced about the axis defined by the corresponding pair of bearing sleeves 32A, 33 or 36, 37 and, due to the downward bending of the outer portion thereof, the end portions 85 of the corresponding tines 83 and 84 are displaced to an extent which is greater than would occur with a strictly rectilinear configuration of the tine carrier half or portion under discussion. The result it to produce an additional upward movement of the tine end portions 85 as they first move into the intermediate position that corresponds to the respective block 51 or 52 being midway between the uppermost and lowermost levels which it can attain and, secondly, as the tines move forwardly to their positions of maximum advance with respect to the direction A. Thus, when the outer portions of the divided tine carriers are bent downwardly to an appropriate extent, the extremities of the tines 83 and 84 of each group 82 will move through a plane that coincides with, or in very close to, the ground surface during angular displacement through the leading substantially 180° arc of the circular path of each group around the corresponding shaft 20 or 21. In any of the embodiments that have been described, the position of said arc substantially 180° through which the tine end portions 85 are substantially continuously in operative contact with the ground surface can be displaced around the axis of the corresponding shaft 20 or 21 by releasing the respective locking pin and turning the mounting 41 of the corresponding swash plate 42 angularly about the associated shaft 20 or 21, subsequently engaging the locking pin 45 in an alternative one of the co-operating holes in the upper plate 59 of the underlying support 43.

The described and illustrated angular shape (as seen in plan view—FIG. 1) of the frame of the machine is such that the rigid junction between its two main frame beams 14 and 15 is substantially at the front of the machine with respect to the direction A, there thus being no frame parts whatsoever above the region of overlap, or close approach, between the paths traced by the tine groups 82 of the respective rake members 1 and 2. This has the considerable advantage that large volumes of hay or other crop can be displaced per unit time by the two rake member 1 and 2 in a generally rearward direction with respect to the direction A without any restriction by the frame, it nevertheless being possible for the machine to be of a restricted height which consequently gives it a center of gravity that is located only a short distance above the ground surface. As each tine group 82 moves rearwardly with respect to the direction A from the region of overlap or closest approach between the two rake members 1 and 2, the tines 83 and 84 thereof are automatically turned upwardly from positions in which their end portions are inclined downwardly and rearwardly from top to bottom with respect to the corresponding direction B and C into positions in which they are spaced upwardly away from the ground surface and are horizontally or substantially horizontally disposed. Under these conditions, any hay or other crop that may remain adhering to the tines can readily slide rearwardly off those tines to fall downwardly to a location approximately between the leading ends of the two swath boards 80. The guiding swath boards 80 subsequently engage the displaced hay or other crop and form it into a sharply defined swath or windrow of clean cross-section having height, width and lateral position with respect to the path of travel of the machine which is dictated by the chosen dispositions of the parallelogram or other quadrilateral linkages which include the respective rods 74 and 75. Although it is preferred to provide the machine with at least one, and advantageously two, of the swath boards 80, it is emphasized that this is not absolutely essential since the efficiency of the tine control or "steering" that is provided is such as to enable hay or other crop to be formed into a swath or windrow that will be adequate for most purposes under the majority of working conditions without the provision of any swatch boards or other guides whatsoever. Moreover, although various haymaking machine embodiments that all comprise a pair of contra-rotating rake members have been described, it is emphasized that many of the features of the invention are equally applicable to haymaking machines of the kind which comprise only a single rotary rake member, such single rotary rake member being used with or without a lateral swath board or other crop guide that, when provided, may advantageously be disposed wholly or principally to the rear of the axis of rotation of the single rake member with respect to the direction A and at one lateral side of that axis when the machine is viewed from the rear in the direction A. It is again noted that, when two contra-rotating rake members are provided as in the embodiments which have been described and that are illustrated on the accompanying drawings, it is by no means essential that the circular paths which are traced by the outermost tines of those rake members during operation of the machine should overlap one another. When, as illustrated in FIG. 1, there is overlap between said paths, the drive transmission to the two rake members is arranged so that the tine groups 82 of one rake member intermesh between the tine groups 82 of the other rake member to avoid collision fouling therebetween.

Although certain features of the haymaking machines that described and illustrated in the accompanying drawings will be set forth in the following claims as inventive features, it is emphasized that the invention is not necessarily limited to those features and includes within its scope each of the parts of each haymaking machine embodiment that has been described, illustrated in the accompanying drawings, or both, individually and in various combinations.

Having described my invention, what I claim as new and desire to secure by Letters Patent of the United States:

1. A hayraking machine including a frame and at least one rotatable rake member supported on said frame, said rake member being rotatable about an axis defined by an upwardly extending shaft mounted on said frame, at least one freely rotatable supporting member connected to the lower portion of said shaft, said supporting member having a ground engaging surface which substantially defines a cylinder having a length greater than its diameter, said cylinder being disposed laterally relative to a vertical plane extending in the intended direction of travel of the machine through said axis, a laterally extending shaft member being mounted on said lower portion, said supporting member being rotatably mounted on said shaft member, bearings being provided in said supporting member, said supporting member being releaseably retained in rotary connection with said shaft member by a locking means provided on said shaft member, said locking means being removably mounted on said shaft member whereby said supporting member is removable from said shaft member, said locking means comprising a bolt and shield received at the outer end of said shaft member which bears against the outer end of said supporting member releaseably retaining said supporting member on said shaft member.

* * * * *